United States Patent
Blankenship et al.

(10) Patent No.: US 7,272,190 B2
(45) Date of Patent: Sep. 18, 2007

(54) METHOD AND APPARATUS FOR DETERMINING CHANNEL QUALITY AND PERFORMING ADAPTIVE MODULATION/CODING WITHIN A MULTICARRIER COMMUNICATION SYSTEM

(75) Inventors: Yufei W. Blankenship, Streamwood, IL (US); Brian K. Classon, Palatine, IL (US); Philippe J. Sartori, Algoquin, IL (US)

(73) Assignee: Motorola, Inc., Schaumburg, IL (US)

( * ) Notice: Subject to any disclaimer, the term of this patent is extended or adjusted under 35 U.S.C. 154(b) by 500 days.

(21) Appl. No.: 10/886,476

(22) Filed: Jul. 7, 2004

(65) Prior Publication Data

US 2006/0008020 A1   Jan. 12, 2006

(51) Int. Cl.
*H04K 1/10* (2006.01)
*H04J 11/00* (2006.01)
(52) U.S. Cl. ........................... 375/260; 370/208
(58) Field of Classification Search ............... 375/242, 375/260, 261, 265; 370/206, 208
See application file for complete search history.

(56) References Cited

U.S. PATENT DOCUMENTS

| 2002/0122381 | A1 | 9/2002 | Wu et al. |
| 2004/0264507 | A1 | 12/2004 | Cho et al. |
| 2005/0157670 | A1* | 7/2005 | Tang et al. ............... 370/320 |
| 2006/0268976 | A1* | 11/2006 | Baum et al. ............... 375/239 |

* cited by examiner

*Primary Examiner*—Young T. Tse

(57) ABSTRACT

In a multi-carrier communication system employing adaptive modulation and coding, a receiver feeds back channel quality information for a "binned" group of subcarriers instead of sending an individual quality report for each subcarrier. A transmitter will utilize the channel quality information for the bin to determine a set of $\gamma_{eff}$ values corresponding to a set of modulation and coding scheme candidates, where $\gamma_{eff}$ is an effective SNR that would yield a same FER in an AWGN channel. The transmitter utilizes the set of $\gamma_{eff}$ values to aid in determining a modulation and coding scheme, and determine a single modulation and coding scheme for all subcarriers within the channel.

17 Claims, 3 Drawing Sheets

400

600

METHOD AND APPARATUS FOR DETERMINING CHANNEL QUALITY AND PERFORMING ADAPTIVE MODULATION/CODING WITHIN A MULTICARRIER COMMUNICATION SYSTEM

FIELD OF THE INVENTION

The present invention relates generally to communication systems, and in particular, to a method and apparatus for determining channel quality and performing adaptive modulation/coding within a multicarrier communication system.

BACKGROUND OF THE INVENTION

Multi-carrier modulation and Orthogonal Frequency Division Multiplexing (OFDM) in particular, are attractive technologies for broadband high data-rate communications due to their robustness against long delay spread and lower complexity when compared to single carrier systems. In addition to multi-carrier modulations, Adaptive Modulation/Coding (AMC) is also a fundamental technique for wireless broadband communications. With AMC, the modulation and coding scheme (MCS) of a transmitted data stream for a particular receiver is changed to predominantly match a current received signal quality (at the receiver) for the particular frame being transmitted. The received signal quality is determined by the channel quality. (The terms "received signal quality" and "channel quality" can be referred to interchangeably). The modulation and coding scheme may change on a frame-by-frame basis in order to track the channel quality variations that occur in mobile communication systems. Thus, streams with high quality are typically assigned higher order modulations and/or higher channel coding rates with the modulation order and/or the code rate decreasing as quality decreases. For those receivers experiencing high quality, modulation schemes such as 16-QAM, 64-QAM or 256-QAM are utilized, while for those experiencing low quality, modulation schemes such as BPSK or QPSK are utilized. Multiple coding rates may be available for each modulation scheme to provide finer AMC granularity, to enable a closer match between the quality and the transmitted signal characteristics (e.g., R=¼, ½, and ¾ for QPSK; R=½ and R=⅔ for 16-QAM, etc.). AMC typically yields higher system throughputs and higher data rates than other conventional link adaptation techniques such as power control.

The performance of any system employing AMC is highly dependent upon the accuracy in determining a receiver's channel quality, and in particular the accuracy of the underlying link error probability prediction. Link error probability prediction maps the current radio conditions (channel quality) to an expected Frame Error Rate (FER). Bad link prediction severely degrades the performance of AMC. In order to achieve high system throughput, a simple link error probability predictor that accurately models coded OFDM performance or any other multi-carrier modulation is therefore critical for any multicarrier system employing AMC. Therefore, a need exists for a method and apparatus for accurately determining channel quality and performing adaptive modulation/coding within a multicarrier communication system.

DETAILED DESCRIPTION OF THE DRAWINGS

Figure 3:
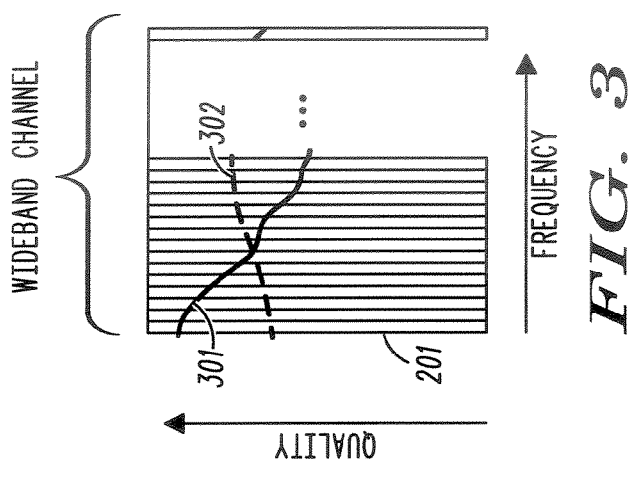
FIG. 3 illustrates channel quality as a function of frequency.

To address the above-mentioned need a method and apparatus for determining channel quality and performing adaptive modulation/coding within a multicarrier communication system is provided herein. More particularly, in a multi-carrier communication system employing adaptive modulation and coding, a receiver feeds back channel quality information for a "binned" group of subcarriers instead of sending an individual quality report for each subcarrier. In a first embodiment a binned group of subcarriers comprises a number of adjacent subcarriers, however in alternate embodiments, the subcarriers need not be adjacent. A transmitter will utilize the channel quality information received for all the bins, and determine a single modulation and coding scheme for all bins within the transmission frame, where a bin comprises a group of subcarriers.

By feeding back channel-quality information for a bin of subcarriers, overhead for transmitting channel quality is greatly reduced. More particularly, since sending channel quality information for each subcarrier would require a very high overhead, a single channel quality report is sent for a group (e.g., 64) of subcarriers instead of sending an individual quality report for each subcarrier.

The present invention encompasses a method for performing adaptive modulation and coding of a data stream in a multi-carrier communication system employing a plurality of subcarriers. The plurality of subcarriers are divided into bins of subcarriers. The method comprises the steps of receiving a channel-quality report comprising a value related to a mean in channel quality for at least one bin of subcarriers, determining a modulation and coding scheme for the data stream based on the received channel-quality report, and utilizing the modulation and coding scheme to transmit the data stream over the multi-carrier communication system.

The present invention additionally encompasses a method for receiving adaptively modulated and coded data in a multi-carrier communication system employing a plurality of subcarriers. As discussed, the plurality of subcarriers are divided into bins of subcarriers. The method comprises the steps of determining channel quality for at least one bin of subcarriers, reporting the channel quality for the bin(s) to a transmitter, wherein the transmitter utilizes the channel quality for the bin(s) to aid in determining a modulation and coding scheme, and receiving data modulated and coded via the modulation and coding scheme.

The present invention additionally encompasses an apparatus for performing adaptive modulation and coding of a data stream in a multi-carrier communication system employing a plurality of subcarriers. As discussed, the plurality of subcarriers are divided into bins of subcarriers. The apparatus comprises an MCS selector receiving a channel-quality report comprising a value related to a mean in channel quality for the at least one bin of subcarriers, the MCS selector outputting a modulation and coding scheme for the data stream based on the received channel-quality report, and a modulator/coder receiving the MCS and outputting modulated and coded data based on the modulation and coding scheme.

Finally, the present invention encompasses an apparatus for receiving adaptively modulated and coded data in a multi-carrier communication system employing a plurality of subcarriers. As discussed, the plurality of subcarriers are divided into bins of subcarriers. The apparatus comprises a bin quality determiner analyzing a received signal and determining a channel quality for the at least one bin of subcarriers and reporting the channel quality for the at least one bin of subcarriers to a transmitter, wherein the transmitter utilizes the channel quality for the at least one bin to aid in determining a modulation and coding scheme, and a receiver for receiving adaptively modulated and coded data that was modulated and coded via the modulation and coding scheme.

Figure 1:
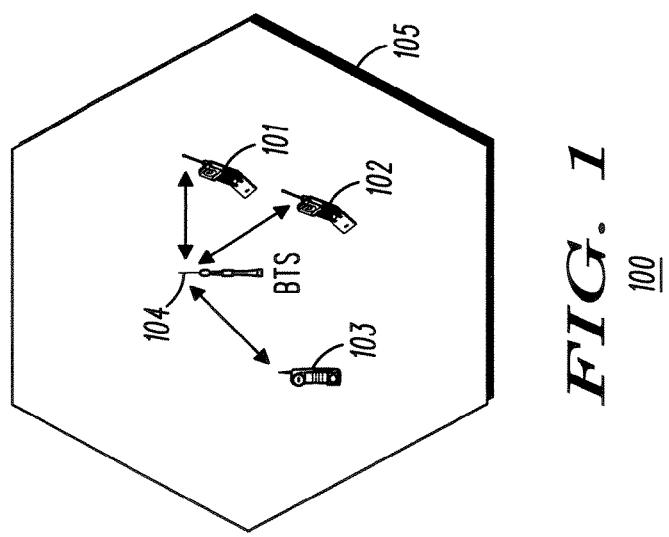
FIG. 1 is a block diagram of a multi-carrier communication system that utilizes adaptive modulation and coding.

Turning now to the drawings, wherein like numerals designate like components, FIG. 1 is a block diagram of multi-carrier communication system 100. Communication system 100 comprises a plurality of cells 105 (only one shown) each having a base transceiver station (BTS, or base station) 104 in communication with a plurality of remote, or mobile units 101-103. In the preferred embodiment of the present invention, communication system 100 utilizes an Orthogonal Frequency Division Multiplexed (OFDM) over-the-air protocol utilizing Adaptive Modulation and Coding (AMC). The architecture may also include the use of multi-carrier spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be also combined with simpler time and/or frequency division multiplexing/multiple access techniques.

Figure 2:
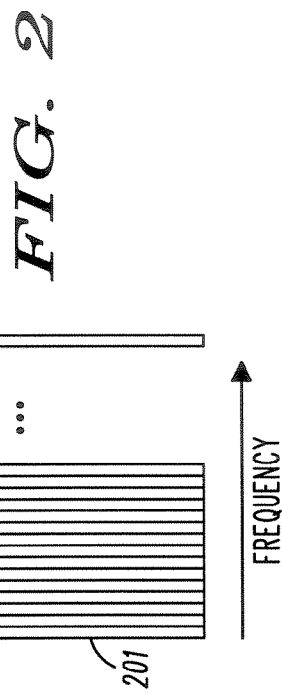
FIG. 2 illustrates the multiple carriers utilized in an OFDM communication system.

As one of ordinary skill in the art will recognize, during operation of an OFDM system, multiple subcarriers (e.g., 768 subcarriers) are utilized to transmit wideband data. This is illustrated in FIG. 2. As shown in FIG. 2 the wideband channel is divided into many narrow frequency bands, or subcarriers 201, with data being transmitted in parallel on subcarriers 201. At the transmission time, a transmitter is typically assigned a plurality of subcarriers.

In addition to OFDM, communication system 100 utilizes AMC. With AMC, the modulation and coding format is changed to predominantly match a current received signal quality of the subcarrier at the receiver for the particular frame being transmitted. In a first embodiment, the same modulation and coding scheme is assigned for predominantly all the subcarriers, and channel coding is done in frequency, across the subcarriers. In alternate embodiments, the modulation and coding scheme may be assigned on a per-subcarrier basis or a per-group of subcarrier basis. The modulation and coding scheme may change on a frame-by-frame basis in order to track the channel quality variations that occur in mobile communication systems. Thus, streams with high quality are assigned higher order modulations and/or higher channel coding rates with the modulation order and/or the code rate decreasing as quality decreases. For those subcarriers experiencing high quality, modulation schemes such as 16-QAM, 64-QAM or 256-QAM are utilized, while for those experiencing low quality, modulation schemes such as BPSK or QPSK are utilized.

In the preferred embodiment of the present invention multiple coding rates are available for each modulation scheme to provide finer AMC granularity, and to enable a closer match between the quality and the transmitted signal characteristics (e.g., coding rate R=¼, ½, and ¾ for QPSK; R=½ and R=⅔ for 16-QAM, etc.). Note that AMC can be performed in the time dimension (e.g., updating the modulation/coding every $N_t$ OFDM symbol periods) or in the frequency dimension (e.g., updating the modulation/coding every $N_{sc}$ subcarriers) or a combination of both. In the preferred embodiment, AMC is performed in the time dimension only.

FIG. 3 illustrates how the quality of the signal can change based on frequency. More particularly, FIG. 3 shows how quality 301 of a signal may vary over frequency, or the channel bandwidth. In this example, quality 301 degrades as the frequency increases. It should be noted however that a different signal with the same average Signal-to-Noise Ratio (SNR) as signal 301 might have a very different channel quality profile. For instance, quality 302 has the same average SNR as 301, but presents much smoother variations than quality 301.

In the preferred embodiment of the present invention base station 104 will determine the modulation/coding scheme utilized for a particular transmitter based on its particular channel quality. However, two transmitters with signal quality 301 and 302, respectively, may experience a very different frame error rate (FER) when assigned the same modulation/coding scheme although they experience the same average SNR. As discussed above, in order to achieve high system throughput, a simple link error probability predictor that accurately models instantaneous coded OFDM performance is therefore critical for any multicarrier system employing AMC. In order to achieve accurate predictions of coded OFDM performance, a modified exponential effective SNR mapping (exp-ESM) method is utilized for channel quality predictions of the multiple subcarriers in the OFDM system.

The Exp-ESM Method

At a given time, the frame-error rate (FER) of a transmission depends on each symbol's signal-to-noise ratio (SNR), denoted by a vector γ which includes the symbol SNR for each subcarrier employed. The basic principle behind the exp-ESM method is to compute an instantaneous effective SNR, $\gamma_{\mathit{eff}}$, that is a function of vector γ so that $$\text{FER}(\gamma)=\text{FER}_{AWGN}(\gamma_{\mathit{eff}}). \tag{1}$$

In other words, $\gamma_{\mathit{eff}}$ is the effective SNR that would yield the same FER in an adaptive White Gaussian noise (AWGN) channel. If there exists a function that can map vector γ to $\gamma_{\mathit{eff}}$, the link adaptation algorithm will be dependent of a single variable together with the a priori knowledge of the FER curve for an AWGN channel. The following function can be used to map γ to $\gamma_{\mathit{eff}}$.

$$\gamma_{\mathit{eff}} = -\beta \ln\left(\frac{1}{N}\sum_{i=1}^{N} e^{-\gamma_i/\beta}\right), \tag{2}$$

where N is the total number of subcarriers utilized, $\gamma_i$ is the symbol SNR experienced on subcarrier i and β is a parameter that must be optimized to provide the best matching. The parameter β is dependant on the code rate, the modulation and the information block size, but is independent of the channel type.

The exp-ESM method with mapping equation (2) works well when the channel information is known for all subcarriers. However, for the deployment in a system such as IEEE 802.16 or 4G, the MCS selection needs to be performed at the base station with only partial channel information since sending channel quality information for all subcarriers would require too much overhead. In order to address this issue, in the preferred embodiment of the present invention a single channel quality report is sent for a group (e.g., 64) of subcarriers instead of sending an individual quality report for each subcarrier. Particularly, a mean and variance of the channel quality for the group of subcarriers is sent instead of sending an individual channel quality report for each subcarrier. Moreover, since channel variations in frequency domain are typically more significant than in time domain, the channel quality report usually captures the frequency-domain variations while assuming no variation between adjacent symbols in time domain. Note that variance $\sigma^2$ and standard deviation $\sigma$ describe the same second order statistics and either the variance or the standard deviation can be used equivalently.

To accommodate subcarrier groupings, the total number of subcarriers used is divided into N' bins. If a bin consists of B subcarriers, then $$N' = \frac{N}{B}. \tag{3}$$

Although equation (3) assumes that all bins are of the same size B for convenience of description, it is understood that bins of different sizes may be used as well. Since $\gamma_i = (h_i)^2 \bar{\gamma}$ in equation (2), where $h_i$ is the channel magnitude on subcarrier i and $\bar{\gamma}$ is the overall average symbol SNR, for each bin k the mean of N' values of $h_i$ can be found, which is denoted as $\mu_k$. Then the mapping function (2) for a modified exp-ESM becomes:

$$\gamma_{\mathit{eff}} = -\beta' \ln\left(\frac{1}{N'} \sum_{k=1}^{N'} e^{\frac{-(\mu_k)^2 \bar{\gamma}}{\beta'}}\right), \tag{4}$$

assuming each subcarrier within bin k has channel magnitude equal to $\mu_k$. Note that $\beta'$ in equation (4) is different from $\beta$ of equation (2) in that $\beta'$ has to account for the additional effect of binning. In some situations the loss of the information of the individual subcarriers may lead to a degradation of the prediction accuracy, and hence poor performance of AMC. Because of this, the present invention includes higher order statistics over a bin to better determine the channel quality of the bin. The method is referred as the "adv-ESM" method.

Let $\mu_k$ be the average over channel magnitude vector $h_k$ (i.e., N' values of $h_i$) of bin k and $\sigma_k^2$ be the variance of $h_k$ over bin k. The mapping function can be generally defined as:

$$\gamma_{\mathit{eff}} = -\beta \ln\left(\frac{1}{N'} \sum_{k=1}^{N'} e^{\Gamma(\mu_k, \sigma_k, \beta)}\right) \tag{5}$$

for mapping the N' channel quality information ($\mu_k$, $\sigma_k$) into a single value of $\gamma_{\mathit{eff}}$. In one example function $\Gamma(\mu_k, \sigma_k, \beta)$ is defined as $$\Gamma(\mu_k, \sigma_k, \beta) = \frac{(\mu_k - f\sigma_k^2)^2 \bar{\gamma}}{\beta}, \tag{6}$$

where f is a parameter optimized based on the bin size. When f and $\beta$ are carefully chosen, this new mapping function leads to a much smaller prediction error than the exp-ESM method with binning, especially for large bin sizes.

Note that since the variance is included to account for the channel variation within a bin, parameter $\beta$ is the same as in equation (2), i.e., the standard exp-ESM method without frequency binning. The scaled variance is included so that with the same $\mu_k$, a channel profile with higher variance is penalized and has smaller $\gamma_{\mathit{eff}}$, and therefore worse FER performance. The value of f is typically close to 0 for low coding rates (e.g., ¼) and increases with the code rate. Also, for the same MCS, f is larger when the bin size increases.

As an example, parameter values for a given information block size of 12032 bits (approximately 1500 bytes) are shown below. The $\beta$ value for three modulations and five code rates are found and tabulated in Table 1. When a bin size of 16 is used, the values of f parameter is found and tabulated in Table 2.

TABLE 1

β values for 15 MCS.

| | Code rate | | | | |
|---|---|---|---|---|---|
| | ⅕ | ¼ | ⅜ | ½ | ¾ |
| QPSK | 1.45 | 1.5 | 1.5 | 1.6 | 1.7 |
| 16-QAM | 2.9 | 3.2 | 4.2 | 5.1 | 7.6 |
| 64-QAM | 4.4 | 5.6 | 8.5 | 13 | 27 |

TABLE 2 f values for 15 MCS with a bin size of 16.

| | Code rate | | | | |
|---|---|---|---|---|---|
| | ⅕ | ¼ | ⅜ | ½ | ¾ |
| QPSK | 0.0 | 0.0 | 0.2 | 0.35 | 1.15 |
| 16-QAM | 0.0 | 0.0 | 0.2 | 0.3 | 0.9 |
| 64-QAM | 0.0 | 0.0 | 0.2 | 0.4 | 0.8 |

Although the channel quality is measured as ($\mu_k$, $\sigma_k$) over channel magnitude vector $h_k$, the mean and variance of other channel quality statistics can be used to construct a function $\Gamma(\mu'_k, \sigma'_k, \beta)$, such as signal-to-noise ratio (SNR), and signal-to-interference and noise ratio (SINR). Also, the channel quality can be determined dynamically periodically.

Moreover, the channel quality report may comprise channel quality values determined via reciprocity in a time-division duplex (TDD) system. In this case, considering that the channel quality is the same observed from the transmitter side or the receiver side, the channel quality report may be effectively binned at the transmitter, instead of the receiver, to apply the adv-ESM method.

Figure 4:
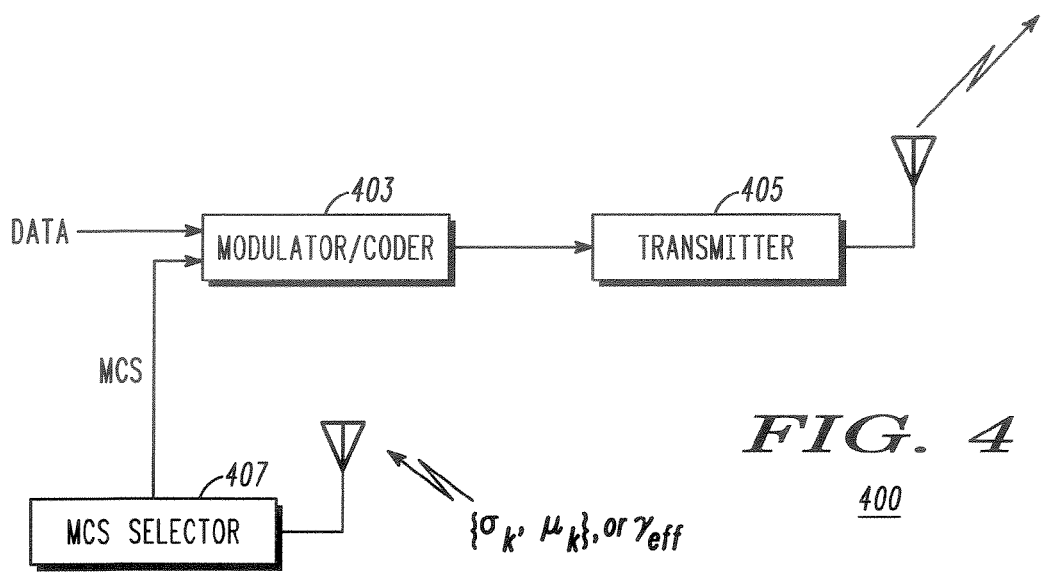
FIG. 4 is a block diagram of a multicarrier transmitter utilizing AMC.

FIG. 4 is a block diagram of multicarrier transmitter 400 utilizing AMC. As discussed above, transmitter 400 receives data that is to be transmitted to a receiver and effectively transmits the data by coding it across multiple subcarriers. A single modulation and coding scheme is used for all subcarriers and is dependent upon the channel quality of predominantly all occupied subcarriers. Thus, data enters the transmitter and is effectively modulated and coded via adaptive modulator and coder 403. After proper modulation and coding, the data stream is transmitted (via transmitter 405) on a plurality of subcarriers.

In the preferred embodiment of the present invention modulator/coder 403 utilizes a modulation and coding scheme that is dependent upon the channel quality of the channel bandwidth. More particularly, MCS selector 407 receives $\mu_k$ and $\sigma_k$ and computes a predicted channel quality ($\gamma_{eff}$) for the number of possible modulation and coding schemes available. MCS selector 407 then chooses the best modulation and coding scheme for that particular channel. In particular the transmitter typically chooses the MCS yielding the highest possible throughput, where the selected MCS usually has an expected FER lower than a target value (typically $10^{-2}$).

It should be noted that instead of receiving $\mu_k$ and $\sigma_k$ for each bin via a channel-quality report, transmitter 400 may simply receive $\gamma_{eff}$ for whole or part of the channel bandwidth, pre-calculated by the receiver. MCS selector 407 would then base the MCS choice for the whole channel bandwidth on the received set of $\gamma_{eff}$ values. It should also be noted that all real quantities will be quantized into a bit pattern for transmission over the air. Also, alternatively, the transmitter may simply receive a preferred MCS value directly computed by the receiver.

Figure 5:
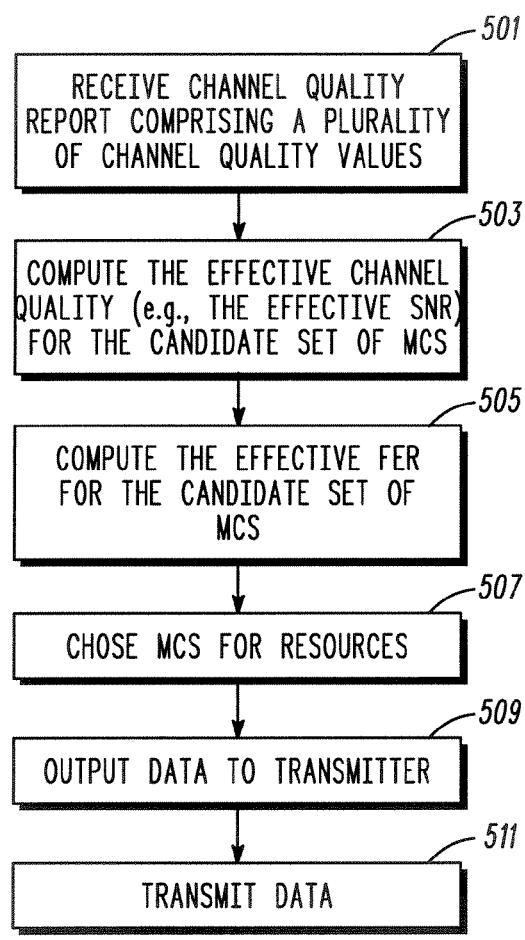
FIG. 5 is a flow chart showing operation of the transmitter of FIG. 4.

FIG. 5 is a flow chart showing operation of the transmitter of FIG. 4. The logic flow begins at step 501 where the transmitter receives an adv-ESM channel quality report, which for at least one frequency bin, contains a value related to the mean and/or a value related to the standard deviation in quality for the bin(s). At step 503 MCS selector 407 computes the effective channel quality for predominantly all the subcarriers (e.g., the effective signal-to-noise ratio (SNR)) for the MCSs that can be assigned using the method described above. At step 505 selector 407 computes the expected FER for all candidate MCS schemes. The candidate MCS scheme may be all or a subset of the available MCS schemes. Alternatively, interpolation techniques can be used to compute the expected FER for some MCSs. The MCS utilized is chosen at step 507 based on the expected FER values. In particular, the MCS that has the highest possible throughput with an expected FER lower than a target value (typically $10^{-2}$) is typically chosen. At step 509 the data stream is input into transmitter 405, being appropriately modulated and coded, and the data stream is transmitted at step 511.

It should be noted that while the above procedure receives a value related to the mean and a value related to the standard deviation of each bin, in an alternate embodiment, $\gamma_{eff}$ for predominantly all subcarriers may be computed by the receiver for a set of MCS and simply transmitted to transmitter 400. In this situation, MCS selector 407 will base the MCS selection on the received set of $\gamma_{eff}$ values.

Additionally, in some situations, a user's data may be transmitted utilizing several, but not all bins. In such a situation an intermediate step is required to select the bins that cover the resources that will be assigned. These resources may be the best bins (based on channel quality), or bins that ease multiplexing concerns. In addition to the above noted events, the following events are envisioned:

There may exist an additional step in FIG. 5 where the transmitter requests the adv-ESM channel quality report (i.e., traffic dependent scheduling), or the receiver may know when to send reports.

The receiver may send back an adv-ESM report or some other report; the above procedure is used only when the adv-ESM report is received.

The assigned MCS is typically the best MCS, though factors such as the data queue, available resources, and multiplexing method can influence the assignment.

The assigned MCS may not be one of the MCS where effective SNR and expected FER are computed (i.e., interpolation could be used to select an intermediate MCS).

There may be a further step in FIG. 5 where the transmitter sends the MCS assignment to the mobile.

If the transmitter knows that the receiver is experiencing a channel with a coherence time less than a small number of frames, the transmitter can average together adv-ESM channel quality reports in order to pick a better MCS for the rapidly changing channel.

Figure 6:
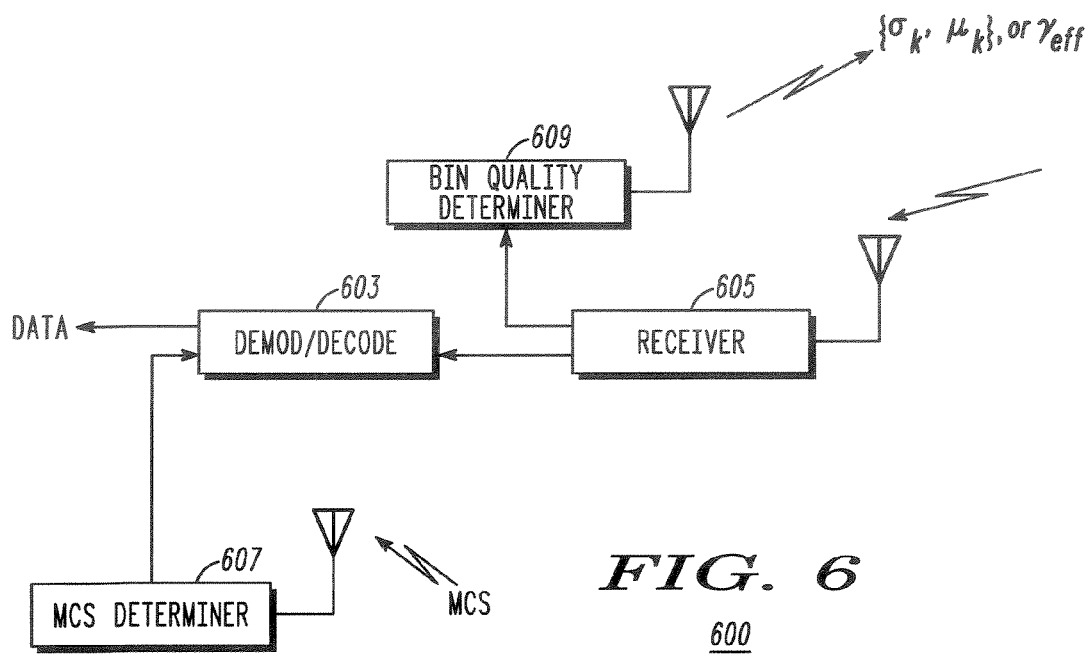
FIG. 6 is a block diagram of a multicarrier receiver.

FIG. 6 is a block diagram of multicarrier receiver 600 that received data that has been adaptively modulated and coded. During operation data is received via a plurality of subcarriers by receiver 605. The received data is demodulated and decoded via decoder 603. MCS determiner 607 receives the current MCS via a control channel, the control channel using a known MCS, and instructs demodulator/decoder to utilize the proper MCS during decoding of the data. MCS can be signaled explicitly, or calculated based on other control information (such as the information block size and the coded block size). The MCS can also be blindly detected. As discussed above, the modulation and coding scheme of decoder 603 is varied based on the received channel quality. Thus, data streams with high quality are typically assigned higher order modulations rates and/or higher channel coding rates with the modulation order and/or the code rate decreasing as quality decreases. For those receivers experiencing high quality, modulation schemes such as 16-QAM, 64-QAM or 256-QAM are utilized, while for those experiencing low quality, modulation schemes such as BPSK or QPSK are utilized. AMC typically yields higher system throughputs and higher data rates than other conventional link adaptation techniques such as power control.

Bin quality determiner 609 analyzes the currently received data stream for utilized subcarriers and determines a mean and a standard deviation in channel quality for the at least one utilized bin. As discussed above, each bin comprises a plurality of adjacent or non-adjacent subcarriers, with the mean and variance of quality being determined for the plurality of adjacent or non-adjacent subcarriers. Additionally, in the preferred embodiment of the present invention a mean and variance of channel magnitude is determined, however, in alternate embodiments of the present invention, other channel quality metrics may be utilized such as SNR, SINR, and uncoded bit error probability. The mean and standard deviations for the plurality of bins utilized (at least one) are then reported back to the transmitter so that an appropriate MCS can be applied to the channel by the transmitter.

As discussed above, by feeding back channel-quality information for a bin of subcarriers, channels overhead is greatly reduced. For example, in a system employing 768 subcarriers and 64 subcarrier bins, only 12 bins exist. The above technique then requires only reporting 12 means and 12 variances in quality to the transmitter instead of reporting 768 quality values. This greatly reduces channel overhead.

Moreover, if a $\gamma_{eff}$ is reported for all 12 bins, then only one channel quality value needs to be reported per MCS.

Figure 7:
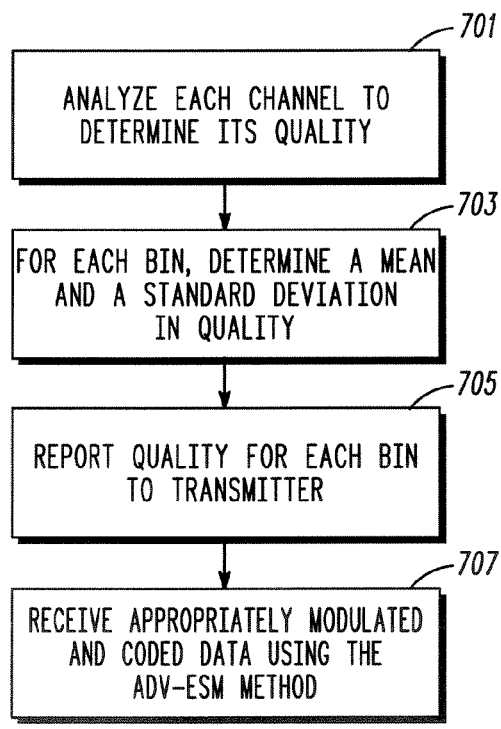
FIG. 7 is a flow chart showing operation of the bin quality determiner of FIG. 6.

FIG. 7 is a flow chart showing operation of bin quality determiner 609. The logic flow begins at step 701 where each utilized channel is analyzed to determine its quality. At step 703 a mean and a variance for the quality of at least one bin is determined. In the preferred embodiment of the present invention, a mean and variance in channel magnitude is determined. At step 705 this mean and variance is reported back to the transmitter to aid in determining an appropriate MCS for each stream using adv-ESM. Finally, at step 707 data is received modulated and coded with the appropriate MCS. As discussed above, in an alternate embodiment of the present invention bin quality determiner may compute the value of $\gamma_{eff}$ for the whole channel and report this value back instead of reporting the mean and standard deviation for the quality of the bins.

Scheduling Using Adv-ESM

Using the adv-ESM method will improve the system performance of all types of scheduling. Scheduling is the operation of partitioning an amount of radio resources and jointly assigning radio resources to each data stream of a group of data streams. As mentioned above, the adv-ESM method may be performed over some or all of the reported bins, and the bins used may be dependent on the type of scheduling planned for the user. Two types of scheduling appropriate for the adv-ESM method include:
1. Frequency non-selective. The adv-ESM method is performed over all (or a representative subset) of reported bins, and a resource assignment is provided such that does not favor the usage of any particular bin.
2. Frequency semi-selective. The transmitter picks a desirable subset of reported bins to perform the adv-ESM computation, and a resource assignment is provided that favors the use of the desired bins. The method is called semi-selective because the reported bin size may be much larger than the best bin size for the coherence frequency of the current channel.

While the invention has been particularly shown and described with reference to a particular embodiment, it will be understood by those skilled in the art that various changes in form and details may be made therein without departing from the spirit and scope of the invention. For example, the invention was described for OFDM, but could be applied to any system using multi-carrier modulations. Additionally, MCS selection could be used only over a fraction of the data streams available, the other data streams using known MCS selection techniques (for instance based on the average SNR value). It is intended that such changes come within the scope of the following claims.

The invention claimed is:

1. A method for performing adaptive modulation and coding of a data stream in a multi-carrier communication system employing a plurality of subcarriers, wherein the plurality of subcarriers are divided into bins of subcarriers, the method comprising the steps of:

receiving a channel-quality report comprising a value related to a mean in channel quality for at least one bin of subcarriers;

determining an expected $\text{FER}_{AWGN}(\gamma_{eff})$ for a set of modulation and coding scheme candidates based on the channel-quality report, where $\gamma_{eff}$ is an effective signal-to-noise ration (SNR) that would yield a same frame error rate (FER) in an adaptive White Gaussian noise (AWGN) channel;

determining a modulation and coding scheme for the data stream based on the expected $\text{FER}_{AWGN}(\gamma_{eff})$; and utilizing the modulation and coding scheme to transmit the data stream over the multi-carrier communication system.

2. The method of claim 1 wherein the step of receiving the channel-quality report comprises the value related to the mean and a mean for at least one bin of OFDM subcarriers.

3. The method of claim 1 wherein the step of receiving the channel-quality report comprises the value related to the mean and a value related to a variance in channel magnitude for the at least one bin of subcarriers.

4. The method of claim 1 wherein the step of receiving the channel-quality report comprises the step of receiving the set of $\gamma_{eff}$ values corresponding to the set of modulation and coding scheme candidates.

5. The method of claim 1 wherein the step of receiving the channel-quality report comprises the value related to the mean and a value related to a variance in SNR for the at least one bin of subcarriers.

6. The method of claim 1 wherein the step of determining the modulation and coding scheme comprises the steps of:

determining an expected FER for the modulation and coding scheme candidates that can be assigned; and choosing the modulation and coding scheme that has a highest possible throughput with an expected FER lower than a target value.

7. The method of claim 6 wherein the step of determining the expected FER comprises the step of determining the expected $\text{FER}_{AWGN}(\gamma_{eff})$, and $$\gamma_{eff} = -\beta \ln\left(\frac{1}{N'}\sum_{k=1}^{N'} e^{\Gamma(\mu_k, \sigma_k, \beta)}\right),$$

where N' is the total number of bins of subcarriers, k represents a bin number, $\beta$ is an optimization parameter, $\mu_k$ is a mean value of the channel quality for bin k, $\sigma_k$ is a variance of the channel quality over bin k, and $\Gamma(\mu_k, \sigma_k, \beta)$ is a function of $\mu_k$, $\sigma_k$ and $\beta$.

8. The method of claim 7 wherein $$\Gamma(\mu_k, \sigma_k, \beta) = \frac{(\mu_k - f\sigma_k^2)^2 \bar{\gamma}}{\beta}, \text{ and}$$

$f$ is an optimization parameter based on a bin size, $\bar{\gamma}$ is an average received symbol SNR.

9. The method of claim 1 wherein the step of determining the modulation and coding scheme comprises the step of determining the modulation from the group consisting of QPSK and 16-QAM.

10. The method of claim 1 wherein the step of determining the modulation and coding scheme comprises the step of determinipg the coding from the group consisting of ¼, ½, and ¾ rate coding.

11. A method for receiving adaptively modulated and coded data in a multi-carrier communication system employing a plurality of subcarriers, wherein the plurality of subcarriers are divided into bins of subcarriers, the method comprising the steps of:

determining channel quality for at least one bin of subcarriers;

reporting to a transmitter, a set of $\gamma_{eff}$ values corresponding to a set of modulation and coding scheme candidates, where $\gamma_{eff}$ is an effective signal-to-noise ratio (SNR) that would yield a same frame error rate (FER) in an adaptive White Gaussian noise (AWGN) channel; and receiving the adaptively modulated and coded data via a modulation and coding scheme based on the set of $\gamma_{eff}$ values.

12. An apparatus for performing adaptive modulation and coding of a data stream in a multi-carrier communication system employing a plurality of subcarriers, wherein the plurality of subearriers are divided into bins of subcarriers, the apparatus comprising:

a modulation and coding scheme (MCS) selector receiving a channel-quality report comprising a value related to a mean in channel quality for at least one bin of subcarriers, the MCS selector outputting a modulation and coding scheme for the data stream based on the received channel-quality report and an effective signal-to-noise ratio (SNR) that would yield a same frame error rate (FER) in an adaptive White Gaussian noise (AWGN) channel; and a modulator/coder receiving the MCS and outputting modulated and coded data based on the modulation and coding scheme.

13. The apparatus of claim 12 further comprising:

a transmitter for transmitting the modulated and coded data over the plurality of subcarriers.

14. The apparatus of claim 12 wherein the channel-quality report additionally comprises a value related to a standard deviation in channel quality for the at least one bin of subcarriers.

15. The apparatus of claim 12 wherein the channel-quality report comprises the value related to the mean and a standard deviation in SNR for the at least one bin of subcarriers.

16. The apparatus of claim 12 wherein the modulation and coding scheme comprises a modulation from the group consisting of QPSK and 16-QAM.

17. An apparatus for receiving adaptively modulated and coded data in a multi-carrier communication system employing a plurality of subcarriers, wherein the plurality of subcarriers are divided into bins of subcarriers, the apparatus comprising:

a bin quality determiner analyzing a received signal from a receiver and determining a set of $\gamma_{eff}$ values corresponding to a set of modulation and coding scheme candidates, where $\gamma_{eff}$ is an effective signal-to-noise ratio (SNR) that would yield a same frame error rate (FER) in an adaptive White Gaussian noise (AWGN) channel; and the receiver for receiving the adaptively modulated and coded data that was modulated and coded via a modulation and coding scheme based on the set of $\gamma_{eff}$ values.

* * * * *